Feb. 25, 1930.　　　G. H. BELL　　　1,748,825
FRUIT CRATE
Filed Nov. 4, 1927
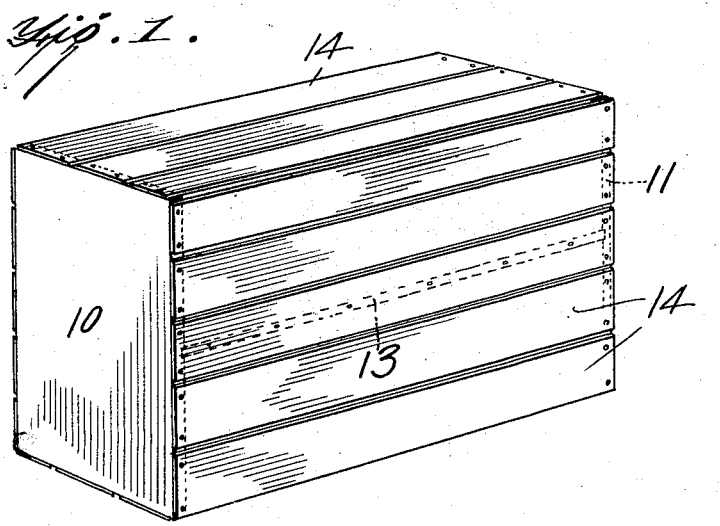
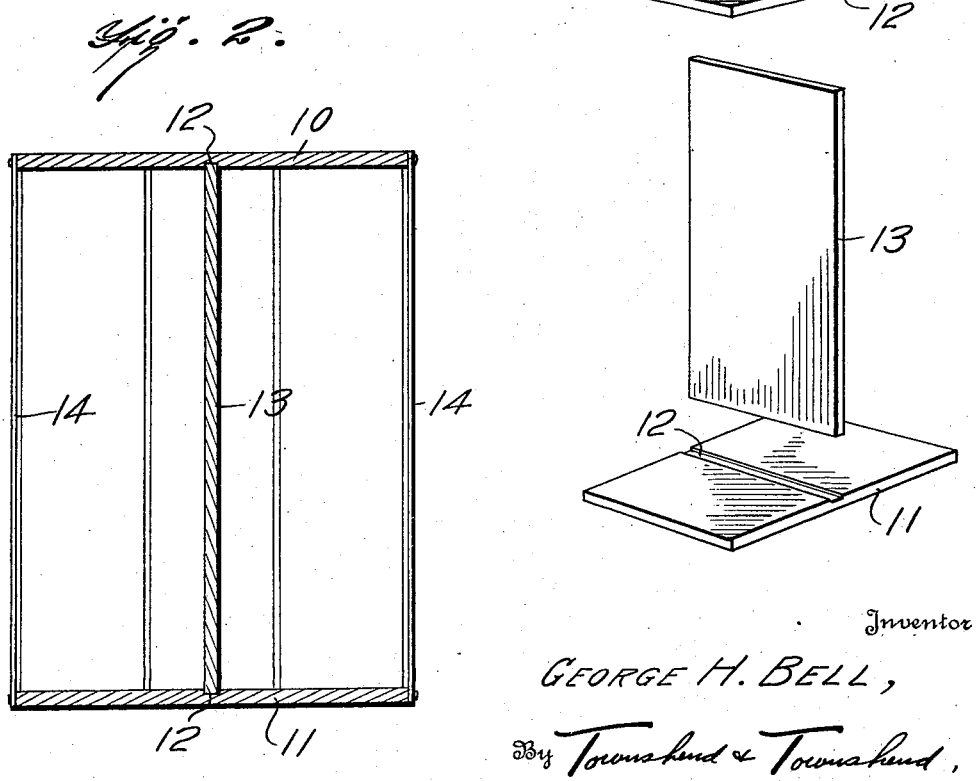
Inventor
GEORGE H. BELL,
By Townshend & Townshend,
Attorneys Patented Feb. 25, 1930

1,748,825

UNITED STATES PATENT OFFICE

GEORGE H. BELL, OF NASHVILLE, ARKANSAS

FRUIT CRATE

Application filed November 4, 1927. Serial No. 231,033.

My invention relates to fruit crates, and in particular to crates designed for the transportation of perishable fruit such as peaches and the like. Much difficulty has heretofore been encountered by shippers in the transportation of peaches and the like perishable fruit commodities, by reason of the fact that in the conventional crate packing arrangements, the fruit is often damaged due to lateral pressure from the sides and ends of crates packed in railways cars.

Primarily, the object of this invention is the provision of a fruit crate having a central longitudinal reinforcement element for resisting end strain on the crates in service and for providing a plurality of compartments within the crate wherein fruit may be packed for handling, through the sides of the crate, by the retailers.

Another object of the invention is the provision of a novel fruit crate construction having means for equalizing end strains throughout the crate structure.

With these and such other objects in view as will be apparent from the description, the invention resides in the novel construction, combination and arrangement of parts hereinafter described and claimed, and illustrated in the accompanying drawings wherein is shown one practical physical embodiment of the invention.

Figure 1 is a perspective view of a crate constructed in accordance with the invention.

Figure 2 is a transverse longitudinal section taken therethrough.

Figure 3 is a group perspective illustrating the manner of assembling the center board and end pieces of the crate.

In detail the crate is made up of two substantially flat rectangular end pieces 10 and 11 formed of appreciably thick, flat board sections and provided on one side face with a groove 12 disposed in the transverse median thereof and extending entirely across the end piece from one side to the other. As seen clearly in Figure 3, these grooves 12 are of uniform dimension throughout and are of a depth substantially one-half the thickness of the end pieces. The side walls of each groove are parallel and are spaced apart a uniform distance throughout the length of each groove.

In assembling a crate in accordance with this invention the end pieces 10 and 11 are disposed in parallel spaced relation with their grooved faces opposed, and a center board 13 is seated in each of the grooves 12, the end pieces being fastened to the center board by any suitable arrangement, either by nailing or cementing as desired.

The length of the center board 13 determines the length of the create and the width of the center board equals the width of the end pieces 10 and 11 so that the ends of the board 13 enter and completely fill the grooves 12. The thickness of the center board is substantially the width of the grooves 12 so that in assembling, a tight frictional seated engagement is obtained at each of the joints.

After the center board and end pieces have been assembled in the manner described, the side walls of the crate are made up in the conventional manner by nailing a requisite number of spaced slats or laths 14 to the edges of the end pieces, the fruit having been packed within the crate on each side of the longitudinal center board 13 before the final slats are secured in position. By this construction it is apparent that the crate is longitudinally divided into two equal compartments, which may be in practice of sufficient size to accommodate one-half bushel each, and the bulged pack of the fruit is laterally outward from the center dividing partition. In packing these crates in freight cars for transportation they are disposed on end with the center board 13 of each crate arranged at a right angle relative to an end of the car. By this method of packing, as the crates are superimposed one upon another, the weight of the crates is distributed through the solid end pieces and sustained by the center board 13 which acts as a supporting column. Furthermore, as the center board is disposed at a right angle with respect to an end of the car in which the crates are transported, any shocks or strains incident to coupling or otherwise of cars, are transmitted to the center boards of each crate which provide an efficient element for resisting such shock and strain, thereby insuring against any damaging of the fruit by undue lateral compression of the slats comprising the walls of the crate.

While in this preferred embodiment of the invention I have illustrated and described certain details entering into the construction and operation thereof, I desire it to be understood that the invention is not to be limited thereby but that any desired changes and modifications may be made in structural details as will fall within the scope of the invention as claimed.

I claim:

1. A fruit crate comprising end pieces having an appreciable thickness connected by light flat spaced strips forming the four walls of the crate, the opposed faces of said end pieces having grooves disposed in a single plane, and a one piece end supporting center board of an appreciable thickness and a width substantially equal to the width of the crate end pieces positioned in said grooves whereby a plurality of said crates when filled may be shipped and stored in vertical stacks and in end to end relation without crushing the same.

2. A fruit crate comprising end pieces having an appreciable thickness connected by light flat spaced strips forming the four walls of the crate, and a one piece end supporting center board of an appreciable thickness and a width substantially equal to the width of the crate secured to said end pieces whereby a plurality of said crates when filled may be shipped and stored in vertical stacks and in end to end relation without crushing the same.

3. A fruit crate comprising rigid end pieces connected by flexible walls, and a rigid longitudinally extended end supporting element within the crate also connecting said end pieces whereby a plurality of such crates when filled may be shipped and stored in vertical stacks and in end to end relation without crushing the same.

In testimony whereof, I affix my signature.

GEORGE H. BELL.